United States Patent [19]

Huang

[11] Patent Number: 5,199,811

[45] Date of Patent: Apr. 6, 1993

[54] TELESCOPIC CONSTRUCTION

[76] Inventor: En-Liung Huang, 7th Fl., No. 97, Le-Li Rd., Taipei City, Taiwan

[21] Appl. No.: 667,037

[22] Filed: Mar. 11, 1991

[51] Int. Cl.⁵ ............................................. F16B 7/12
[52] U.S. Cl. ................................... 403/108; 403/109; 403/328; 403/378; 280/655; 248/333
[58] Field of Search .............. 403/108, 109, 328, 377, 403/378, 320, 362, 326, 329; 138/120; 190/104; 248/333, 407, 408, 410, 412; 280/655, 655.1

[56] References Cited

U.S. PATENT DOCUMENTS 3,998,476 12/1976 Kazmark, Sr. .................. 403/108 X
4,618,035 10/1986 Mao .................................. 280/655
4,896,897 1/1990 Wilhelm ............................ 280/655

*Primary Examiner*—Peter M. Cuomo
*Assistant Examiner*—Harry C. Kim
*Attorney, Agent, or Firm*—Willian Brinks Olds Hofer Gilson & Lione

[57] ABSTRACT

A telescopic construction includes a first tubular section provided with an axially extending slot and a guide seat having a central through hole and an inclined guide notch extending downward from a top side of the guide seat and communicated with the central through hole. The first tubular section extends into the central through hole such that an upper portion of the axially extending slot directly faces the inclined guide notch. A second tubular section is slidably disposed inside the first tubular section and has a radial hole aligned with the axially extending slot. A positioning member, disposed inside the second tubular section, has a stud biased to project through the radial hole and the axially extending slot. The stud engages the inclined guide notch and an upper end of the axially extending slot when the second tubular section is expanded from the first tubular section. Downward movement of the second tubular section relative to the first tubular section causes the inclined guide notch to push the stud into the radial hole to disengage the inclined guide notch, thereby retracting the second tubular section into the first tubular section.

2 Claims, 8 Drawing Sheets

TELESCOPIC CONSTRUCTION

BACKGROUND OF THE INVENTION

1. Field Of The Invention

The invention relates to a telescopic construction, more particularly to a telescopic construction which can be easily retracted and is relatively stable.

2. Description Of The Related Art

Foldable luggage stroller frames usually incorporate telescopically connected sections for the handle portions thereof. Referring to FIG. 1, a conventional telescopic construction is shown to comprise a first tubular section 11 slidably disposed inside a second tubular section 10. A positioning member 13 locks the first tubular section 11 onto the second tubular section 10 at a fully expanded position. When retracting the first tubular section 11 into the second tubular section 10, the positioning member 13 is pressed to unlock the first tubular section 11 from said second tubular section 10. At the same time, an axial downward force is applied on the first tubular section 11 to thereby retract said first tubular section 11 into the second tubular section 10.

Referring to FIG. 2, the length of the telescopic connection may be increased by adding a third tubular section 12 and slidably disposing the same inside the first tubular section 11. A second positioning member 14 is provided to lock the third tubular section 12 onto the first tubular section 11 at a fully expanded position. To fully retract the telescopic construction, the second positioning member 14 is pressed to unlock the third tubular section 12 from the first tubular section 11, and at the same time, an axial downward force is applied on said third tubular section 12 to retract said third tubular section 12 into said first tubular section 11. The positioning member 13 is then pressed to unlock the first tubular section 11 from the second tubular section 10, and at the same time, an axial downward force is applied on said first tubular section 11 to fully retract the telescopic construction of FIG. 2.

Some of the drawbacks of the above disclosed telescopic constructions are as follows:

1. The conventional telescopic constructions, when applied to luggage stroller frames, are inconvenient to fold, especially for relatively tall people. During the folding process, one has to bend and press the positioning members and, at the same time, push the innermost tubular section toward the outermost tubular section.

2. When expanding the conventional telescopic constructions, it is possible that the positioning member does not properly lock the inner tubular section onto the outer tubular section, thereby failing to maintain said inner tubular section at its fully expanded position.

SUMMARY OF THE INVENTION

Therefore, the main objective of the present invention is to provide a telescopic construction which overcomes the drawbacks commonly associated with conventional telescopic constructions.

Accordingly, the preferred embodiment of a telescopic construction of the present invention comprises: a first tubular section having a first base portion and a first restricted tube portion extending upwardly from the first base portion, the first restricted tube portion being provided with an axially extending slot; a guide seat having a central through hole and a first inclined guide notch extending downward from a top side of the guide seat and communicated with the through hole, the first restricted tube portion extending into said through hole such that an upper portion of the axially extending slot directly faces the first inclined guide notch; a second tubular section having a second base portion and a second restricted tube portion extending upwardly from the second base portion, the second tubular section being slidably disposed inside the first tubular section, the second restricted tube portion having a first radial hole aligned with the axially extending slot; and a first positioning member disposed inside the second restricted tube portion and having a first stud biased to project through the first radial hole and the axially extending slot. The guide seat has a radial threaded bore communicated with the through hole. A threaded stub is received in the threaded bore to lock the guide seat on the first restricted tube portion. The first positioning member has a resilient strip to bias the first stud to project through the first radial hole and the axially extending slot. The resilient strip has a first segment extending upwardly from the first stud and parallel to the axis of the second tubular section, and a second segment extending from one end of the first segment distal from the first stud and inclining downward to a point on the second restricted tube portion diametrically opposite and above the first radial hole. The first stud engages the first inclined guide notch and an upper end of the axially extending slot when the second tubular section is expanded from the first tubular section. Downward movement of the second tubular section relative to the first tubular section causes the first inclined guide notch to push the first stud into the first radial hole to disengage the first inclined guide notch, thereby retracting the second tubular section into the first tubular section.

In a second preferred embodiment of the present invention, the first restricted tube portion has a second inclined guide notch extending downward from a top end of the first restricted tube portion. A third tubular section is slidably disposed inside the second tubular section and has a third base portion and a third restricted tube portion extending upwardly from the third base portion. The third restricted tube portion has a second radial hole axially aligned with the second inclined guide notch. A second positioning member is disposed inside the third restricted tube portion and has a second stud biased to project through the second radial hole. Downward movement of the third tubular section relative to the second tubular section causes the second inclined guide notch to push the second stud into the second radial hole to retract the third tubular section into said second tubular section.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
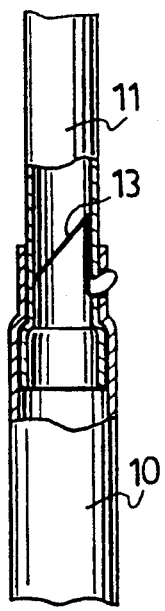
FIG. 1 is a partially sectional view of a conventional telescopic construction having two telescopic sections.
Figure 2:
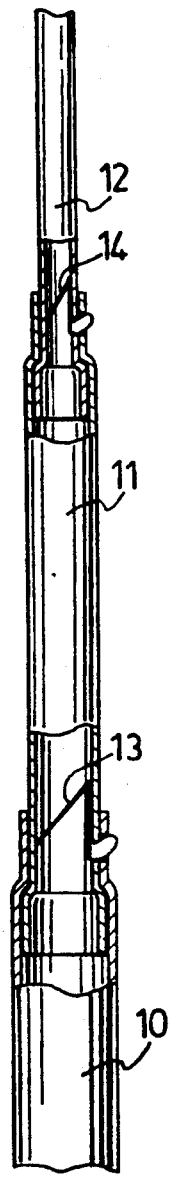
FIG. 2 is a partially sectional view of a conventional telescopic construction having three telescopic sections.
Figure 3:
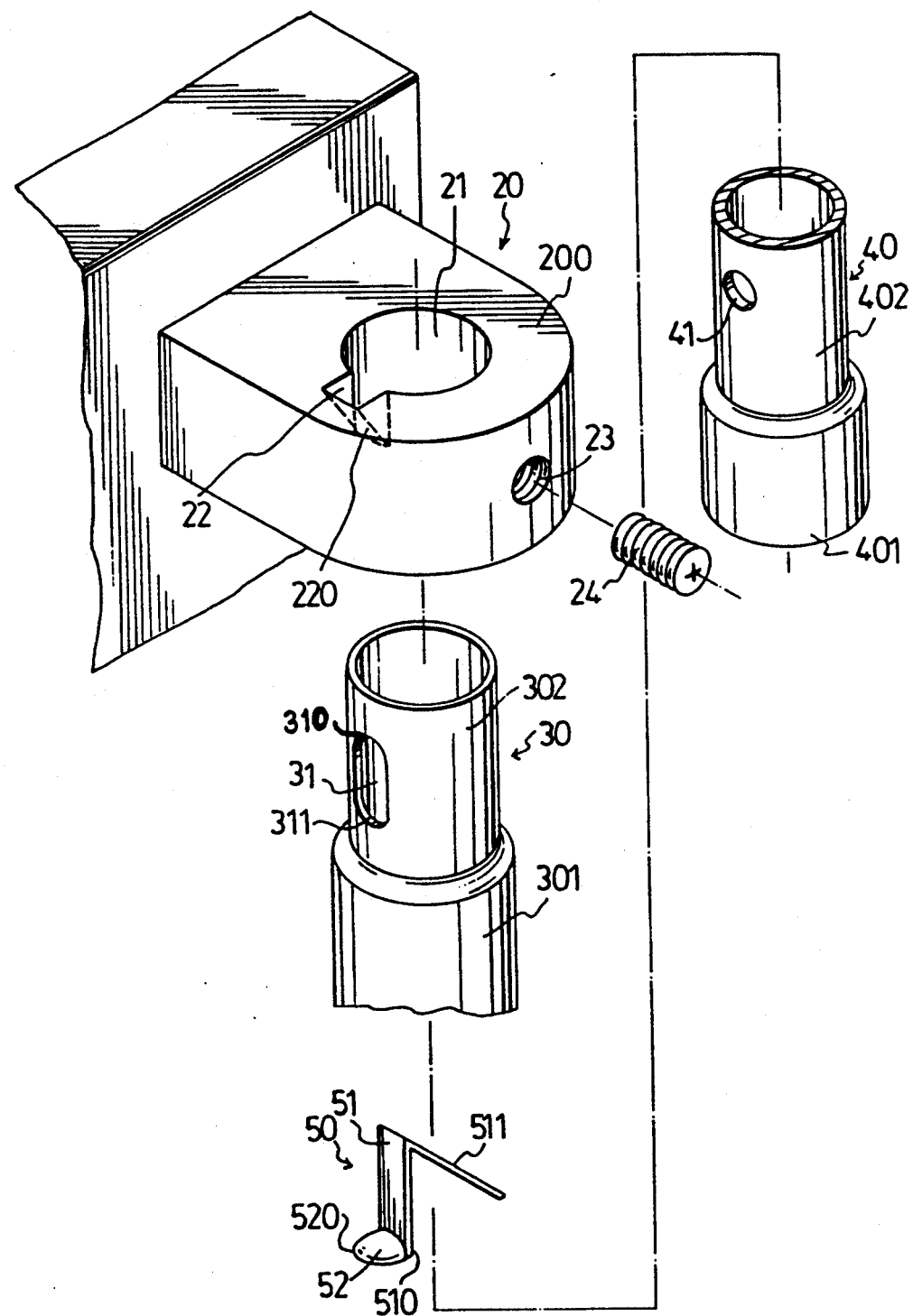
FIG. 3 is an exploded view of the first preferred embodiment of a telescopic construction according to the present invention.

Referring to FIG. 3, the first preferred embodiment of a telescopic construction according to the present invention is shown to comprise a guide seat 20, a first tubular section 30, a second tubular section 40, and a positioning member 50.

The guide seat 20 has a central through hole 21. An inclined guide notch 22 extends downward from a top side 200 of said guide seat 20 and is communicated with the through hole 21. The guide seat 20 further has a radial threaded bore 23 extending inward from a front end of said guide seat 20 and into the through hole 21. The threaded bore 23 receives a threaded stub 24.

The first tubular section 30 has a base portion 301 and a restricted tube portion 302 extending upwardly from the base portion 301. The restricted tube portion 302 is provided with an axially extending slot 31. The axially extending slot 31 has substantially curved upper and lower ends, 310 and 311. The restricted tube portion 302 extends into the through hole 21 of the guide seat 20 such that the upper portion of the axially extending slot 31 directly faces the inclined guide notch 22.

The second tubular section 40 similarly has a base portion 401 and a restricted tube portion 402 extending upwardly from the base portion 401. The second tubular section 40 is to be slidably disposed inside the first tubular section 30. The restricted tube portion 402 has a radial hole 41 to be aligned with the axially extending slot 31.

The positioning member 50 includes a resilient strip 51 and a stud 52 provided on one end of the resilient strip 51. The positioning member 50 is to be disposed inside the second tubular section 40. The resilient strip 51 biases the stud 52 to project through the radial hole 41 and the axially extending slot 31. The peripheral surface of the stud 52 corresponds with the curved ends, 310 and 311, of the axially extending slot 31. The resilient strip 51 has a first segment 510 extending upward from the stud 52 and parallel to the axis of the second tubular section 40, and a second segment 511 extending from the end of the first segment 510 distal from said stud 52 and inclining downward to a point on said second tubular section 40 diametrically opposite and above the radial hole 41.

Figure 4:
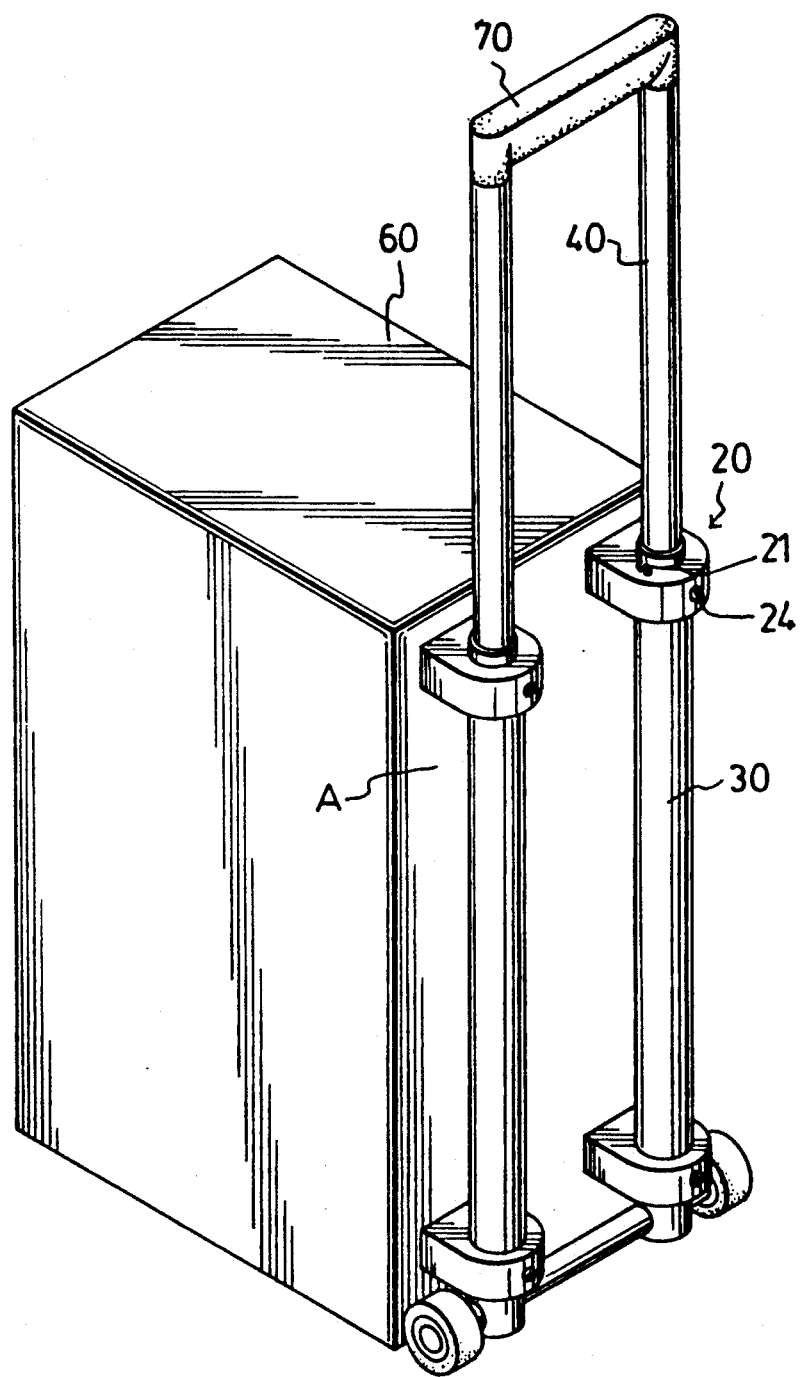
FIG. 4 is an illustration of the first preferred embodiment when incorporated in a luggage stroller frame.

Referring to FIG. 4, the preferred use of the telescopic construction of the present invention is in a luggage stroller frame for carrying a suitcase 60 or any similar article. The luggage stroller is shown to have a pair of spaced and longitudinally extending first tubular sections 30 and a pair of guide seats 20 sleeved on the first tubular sections 30 and abutting a flat side (A) of the suitcase 60. Threaded stubs 24 lock the guide seats 20 onto the respective first tubular section 30. The top ends of second tubular sections 40, slidably disposed inside the first tubular sections 30, are connected by a transversely extending handlebar 70.

Figure 5:
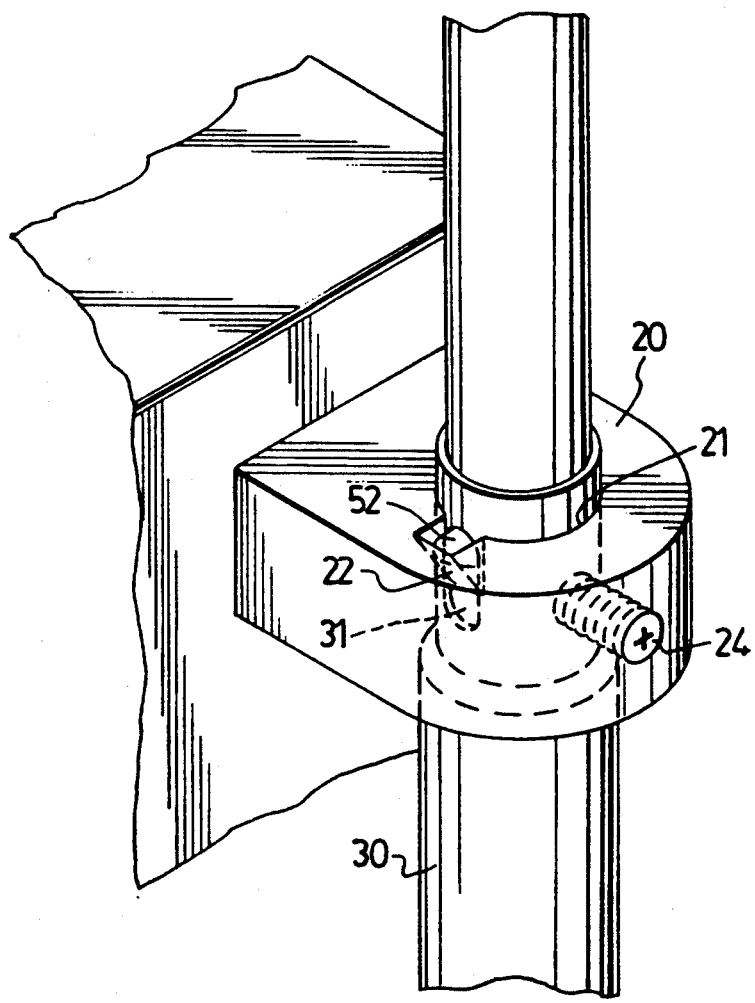
FIG. 5 is a perspective view of the first preferred embodiment illustrating its assembly.
Figure 6C:
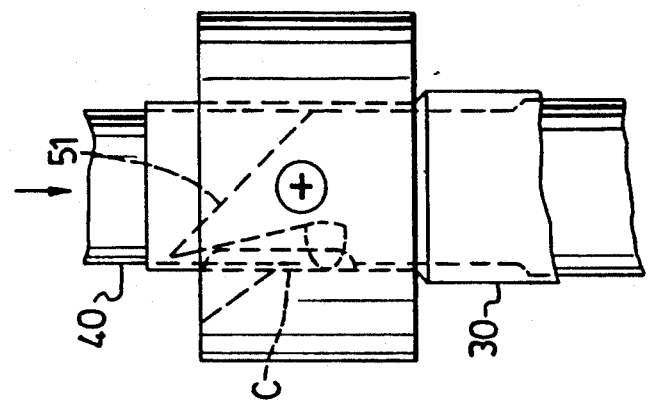
FIGS. 6A, 6B and 6C illustrate the retracting procedure of the first preferred embodiment.
Figure 6B:
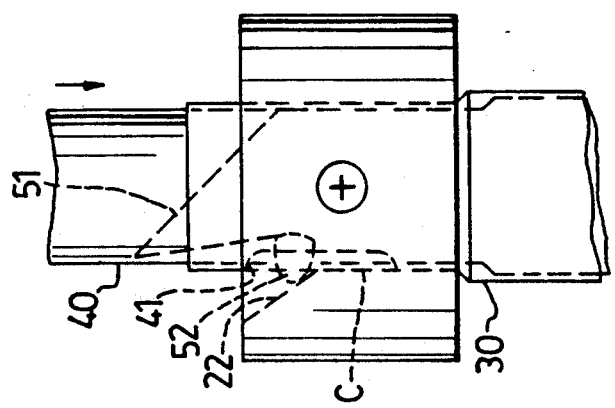
Figure 6A:
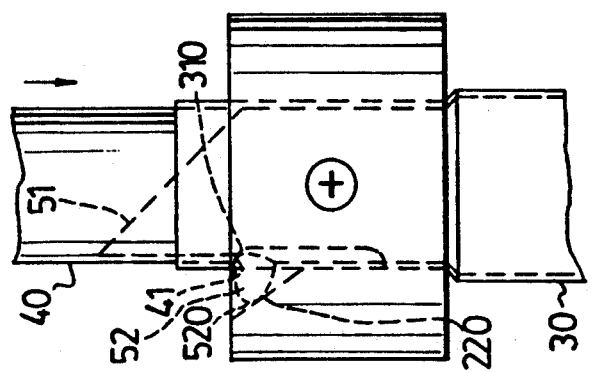

Referring to FIGS. 3, 4 and 5, when the second tubular section 40 is pulled from the first tubular section 30, the tip 520 of the stud 52 extends into the notch 22 and contacts an inclined slide face 220 of the guide seat 20. The stud 52 also engages the upper end 310 of the axially extending slot 31. To retract the second tubular section 40 into the first tubular section 30, an axial downward force is applied on said second tubular section 40, as shown in FIG. 6A. Downward movement of the second tubular section 40 causes the inclined slide face 220 to push the tip 520 of the stud 52 inward against the action of the resilient strip 51, as shown in FIG. 6B. Further downward movement of the second tubular section 40 causes the stud 52 to disengage the inclined slide face 220 and contact the inner wall (C) of the guide seat 20 and the lower end 311 of the axially extending slot 31, as shown in FIG. 6C, to fully retract said second tubular section 40 into the first tubular section 30.

To draw the second tubular section 40 from the first tubular section 30, an axial pulling force is applied on said second tubular section 40 to move said second tubular section 40 away from said first tubular section 30. The stud 52 is correspondingly moved upward, away from the lower end 311 of the axially extending slot 31, to once more engage the inclined slide face 220 and the upper end 310 of said axially extending slot 31.

Figure 7:
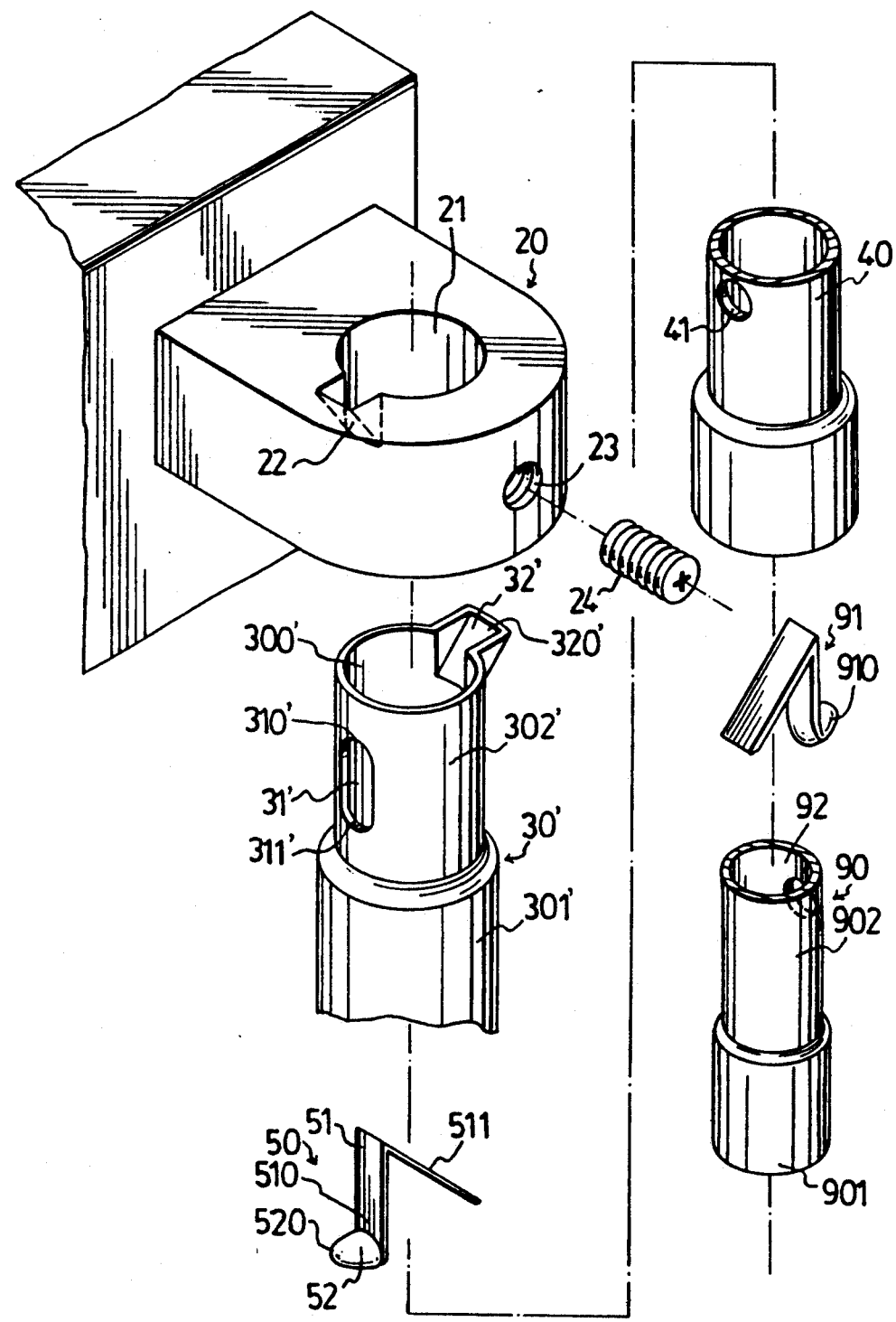
FIG. 7 is an exploded view of the second preferred embodiment of a telescopic construction according to the present invention.

Referring to FIG. 7, the second preferred embodiment of a telescopic construction according to the present invention is shown to comprise a guide seat 20, a first tubular section 30', a second tubular section 40, a third tubular section 90, a first positioning member 50, and a second positioning member 91.

The construction of the guide seat 20, the second tubular section 40, and the first positioning member 50 are unchanged and will not be detailed further. The first tubular section 30' is substantially similar to the first tubular section 30 of the first preferred embodiment. The first tubular section 30' has, however, an inclined guide notch 32' extending downward from a top end of the first tubular section 30' and communicating with the axial hollow space 300' confined by the first tubular section 30'. The inclined guide notch 32' is diametrically opposite the axially extending slot 31' of the first tubular section 30'.

The third tubular section 90 has a base portion 901 and a restricted tube portion 902 extending upwardly from the base portion 901. The third tubular section 90 is slidably disposed inside the second tubular section 40. The restricted tube portion 902 has a radial hole 92 axially aligned with the inclined guide notch 32'.

The second positioning member 91 is similar in construction to the first positioning member 50. The second positioning member 91 is disposed inside the third tubular section 90 and has a stud 910 biased to project through the radial hole 92.

Figure 8:
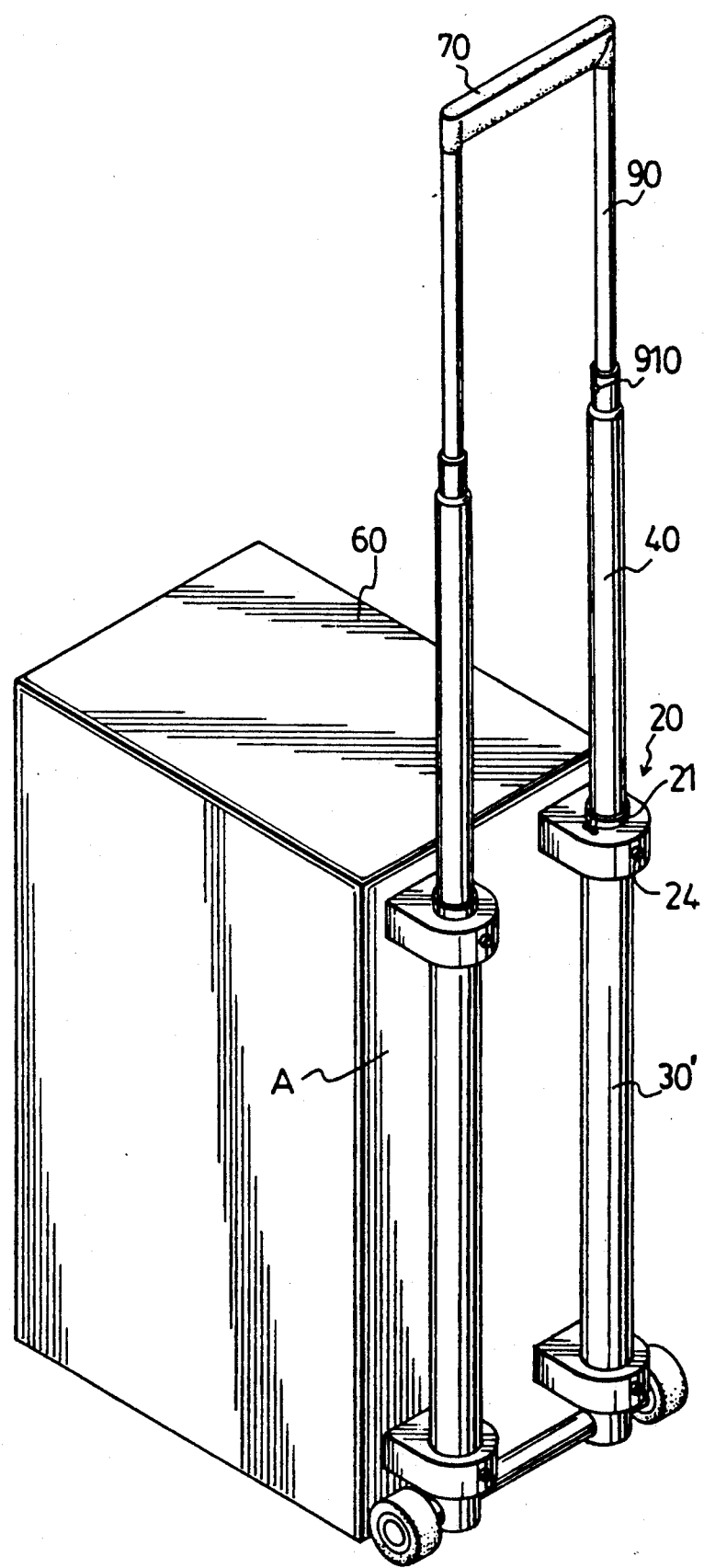
FIG. 8 is an illustration of the second preferred embodiment when incorporated in a luggage stroller frame.

Referring to FIGS. 7 and 8, the second preferred embodiment is used in a luggage stroller frame so as to permit the handlebar 70 to be positioned at a higher level. When the second preferred embodiment is in a fully expanded position, the stud 910 of the second positioning member 91 projects through the radial hole 92 of the third tubular section 90 and the stud 52 of the first positioning member 52 engages the inclined guide notch 22 of the guide seat 20.

Figure 9C:
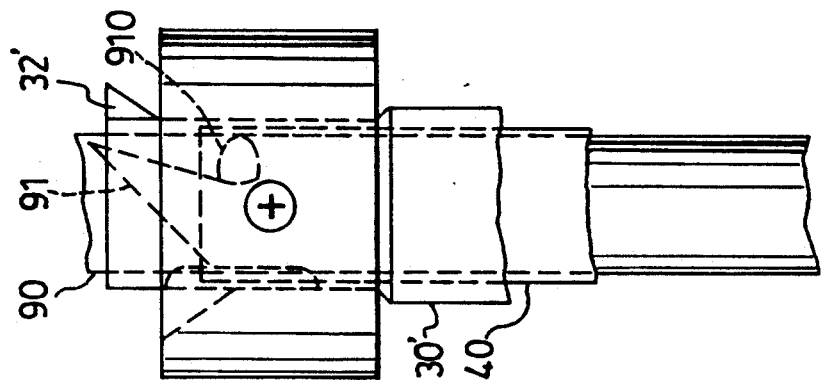
FIGS. 9A, 9B and 9C illustrate the retracting procedure of the second preferred embodiment.
Figure 9B:
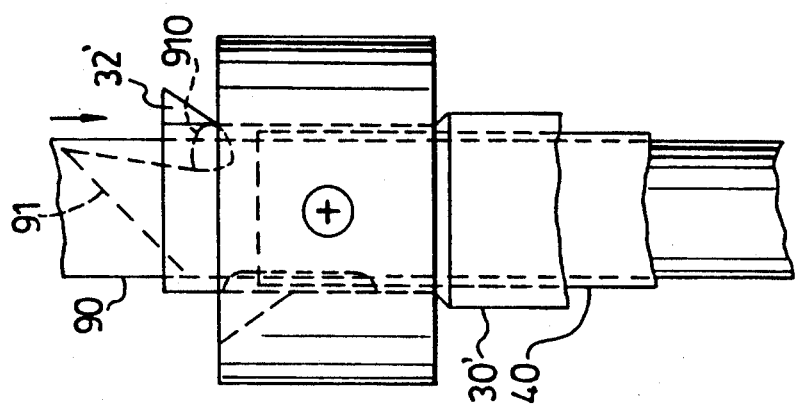
Figure 9A:
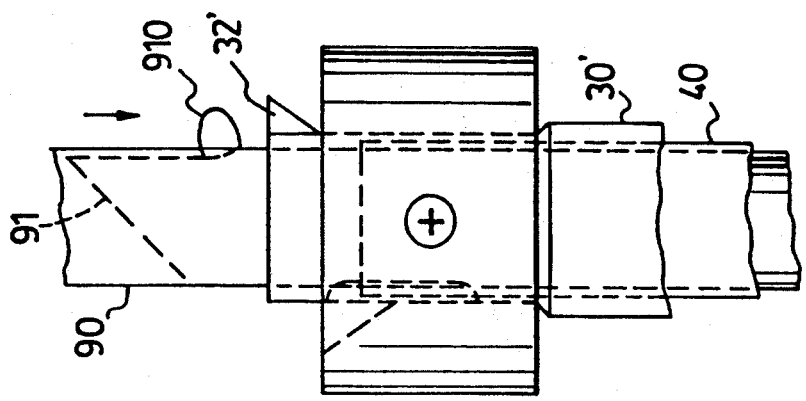

When fully retracting the second preferred embodiment, application of an axial downward force on the second tubular section 40 or on the third tubular section 90 causes said second tubular section 40 to be fully retracted into the first tubular section 30'. Retraction of the third tubular section 90 into the second tubular section 40 does not occur as long as the stud 910 does not engage the inclined guide notch 32', as shown in FIG. 9A. When the stud 910 comes into contact with an inclined slide face 320' of the inclined guide notch 32', further downward movement of the third tubular section 90 causes the inclined slide face 320' to push said stud 910 into the radial hole 92 of the third tubular section 90, as shown in FIG. 9B. The stud 91 eventually disengages the inclined guide notch 32' and contacts the inner wall of the second tubular section 40, as shown in FIG. 9C, to complete the retraction of the second preferred embodiment. Expansion of the second preferred embodiment is accomplished by simply pulling the innermost tubular section, i.e., the third tubular section 90, away from the first tubular section 30', until the stud 52 engages the notch 22 and the stud 910 moves past the inclined guide notch 32'.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A telescopic construction, comprising:
    a first tubular section having a first base portion and a first restricted tube portion extending upwardly from said first base portion, aid first restricted tube portion being provided with an axially extending slot;
    a guide seat having a central through hole and a first inclined guide notch extending downward from a top side of said guide seat and communicated with said through hole, said first restricted tube portion extending into said through hole such that an upper portion of said axially extending slot directly faces said first inclined guide notch;
    said guide seat having a radial threaded bore communicated with said through hole, said telescopic construction further comprising a threaded stud received in said threaded bore to lock said guide seat on said first restricted tube portion;
    a second tubular section having a second base portion and a second restricted tube portion extending upwardly from said second base portion, said second tubular section being slidably disposed inside said first tubular section, said second restricted tube portion having a first radial hole aligned with said axially extending slot;
    a first positioning member disposed inside said second restricted tube portion and having a first stud biased to project through said first radial hole and said axially extending slot;
    said first stud engaging said first inclined guide notch and an upper end of said axially extending slot when said second tubular section is expanded from said first tubular section, the downward movement of said second tubular section relative to said first tubular section causing said first inclined guide notch to push said first stud into said first radial hole to disengage said first inclined guide notch, thereby retracting said second tubular section into said first tubular section;
    said first restricted tube portion having a second inclined guide notch extending downward from a top end of said first restricted tube portion;
    a third tubular section having a third base portion and a third restricted tube portion extending upwardly from said third base portion, said third tubular section being slidably disposed inside said second tubular section, said third restricted tube portion having a second radial hole axially aligned with said second inclined guide notch; and
    a second positioning member disposed inside said third restricted tube portion and having a second stud biased to project through said second radial hole;
    whereby, the downward movement of said third tubular section relative to said second tubular section causes said second inclined guide notch to push said second stud into said second radial hole to retract said third tubular section into said second tubular section.

2. The telescopic construction as claimed in claim 1, wherein said second inclined guide notch is diametrically opposite said axially extending slot of said first tubular section.

* * * * *

UNITED STATES PATENT AND TRADEMARK OFFICE
CERTIFICATE OF CORRECTION

PATENT NO. :  5,199,811
DATED :  April 6, 1993
INVENTOR(S) :  En-Liung Huang

It is certified that error appears in the above-identified patent and that said Letters Patent is hereby corrected as shown below:

Column 5, line 35:

In claim 1, line 4, delete "aid" and substitute therefor "said".

Signed and Sealed this

Thirty-first Day of May, 1994

Attest:

BRUCE LEHMAN

Attesting Officer     Commissioner of Patents and Trademarks